United States Patent
Hours et al.

(10) Patent No.: US 9,846,758 B2
(45) Date of Patent: Dec. 19, 2017

(54) METHOD OF DESIGNING AN INTEGRATED CIRCUIT AND COMPUTER PROGRAM PRODUCT

(71) Applicants: Xavier Hours, Tournefeeuille (FR); David M. Grochowski, Austin, TX (US); Bernd E. Kastenmeier, Austin, TX (US); Karl Wimmer, Austin, TX (US)

(72) Inventors: Xavier Hours, Tournefeeuille (FR); David M. Grochowski, Austin, TX (US); Bernd E. Kastenmeier, Austin, TX (US); Karl Wimmer, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/899,280

(22) PCT Filed: Jul. 23, 2013

(86) PCT No.: PCT/IB2013/001804
§ 371 (c)(1),
(2) Date: Dec. 17, 2015

(87) PCT Pub. No.: WO2015/011514
PCT Pub. Date: Jan. 29, 2015

(65) Prior Publication Data
US 2016/0132628 A1    May 12, 2016

(51) Int. Cl.
*G06F 17/50*    (2006.01)

(52) U.S. Cl.
CPC ...... *G06F 17/5072* (2013.01); *G06F 17/5009* (2013.01); *G06F 17/5068* (2013.01); *G06F 2217/12* (2013.01); *Y02P 90/265* (2015.11)

(58) Field of Classification Search
USPC .......................................................... 716/115
See application file for complete search history.

(56) References Cited

U.S. PATENT DOCUMENTS

| | | | |
|---|---|---|---|
| 2011/0307854 A1* | 12/2011 | Lu | G06F 17/5072 716/119 |
| 2012/0096419 A1* | 4/2012 | Mina | G06F 17/5068 716/106 |

OTHER PUBLICATIONS

Yue et al., "Cell-Based High-Frequency IC Design in Scaled CMOS", IEEE International Workshop on Radio-Frequency Integration Technology, Dec. 9-11, 2007, pp. 195-200.
International Search Report for International application No. PCT/IB2013/001804 dated Jul. 22, 2014.

(Continued)

*Primary Examiner* — Eric Lee

(57) ABSTRACT

A method of designing an integrated circuit is described. The integrated circuit comprises a plurality of circuit components, including one or more functional components and one or more tile shapes. A pcell instance may be defined to specify a functional component along with one or more tile shapes. The tile shapes are thus associated with the functional component. A netlist may be arranged to specify interconnections between the functional components of the integrated circuit as well as electrical interactions between the tile shapes and functional components.
A computer program product for carrying out the method is also described.

13 Claims, 3 Drawing Sheets

(56) References Cited

OTHER PUBLICATIONS

Scagnelli et al, "Pattern Density Methodology Using IBM Foundry Technologies", Electronic Components and Technology Conference, May 29-Jun. 1, 2007, pp. 1300-1307.
Woltjer et al, "An industrial view on compact modeling", Proceeding of the 36th European Solid-State Device Research Conference, Sep. 19-21, 2006, pp. 41-48.
Wanta, "Layout Dependent Effect Aware Design Flow", CDNLive 2012, 2012, pp. 1-35.
Gastro-Lopez et al, "Generation of Technology-Independent Retargetable Analog Blocks", Analog Integrated circuits and Signal Processing, Nov. 2002, pp. 157-170.

\* cited by examiner

METHOD OF DESIGNING AN INTEGRATED CIRCUIT AND COMPUTER PROGRAM PRODUCT

FIELD OF THE INVENTION

This invention relates to a method of designing an integrated circuit and to a computer program product.

BACKGROUND OF THE INVENTION

An integrated circuit is a miniaturized electric circuit that comprises a large number of elementary components such as conductors, diodes, transistors, transmission lines, capacitors, and inductors. The elementary components and their mutual distances within an integrated circuit have become smaller and smaller as a consequence of progress in manufacturing techniques. The various processing techniques and also the resulting circuits may be classified by referring to so-called technology nodes. A technology node comprises methods capable of producing integrated circuits with a certain smallest possible distance between neighboring components in the circuit. For instance, the 130 nanometer technology node refers to production methods of devices with a gate length of 130 nm.

For technology nodes of 130 nanometers and less, i.e., for 130 nanometer technology nodes and more recent technology nodes, it is an established technique to place tile shapes during a layout finishing flow in order to ensure planarization. Tile shapes are also known as fill shapes. The circuit layout including the tile shapes may then be analyzed in order to verify whether it satisfies a density rule, or a set of density rules. Defined regions of a layer or surface within the integrated circuit may be assigned density values. A density rule is a set of one or more constraints on density values associated with such regions. A density value of a certain region may be defined as the area covered by a certain type of components located within that region relative to the total area of the region. For example, a variation of density values across the entire layer or surface may be required not to exceed a maximum allowed density variation. Components of different types, e.g., metal and silicon, may be assigned separate density values.

Regions in which transistors are to be implanted may be referred to as active regions or active areas. Active regions may also be subject to density rules. To this end, tile shapes may be provided in addition to the functional components. The tile shapes may, in principle, consist of any material suitable for satisfying the density rules in question. A tile shape in a certain layer of the integrated circuit may be formed of the basic material of that layer, e.g., metal or polysilicon. If, for example, an area covered by a combination of fill shapes and metal shapes does not meet specific density criteria, a circuit designer may have to place additional fill shapes manually or with the help of automated tools.

For technology nodes of 90 nanometers and more, the tile shapes usually have a negligible effect on the electrical performance of the integrated circuit. However, for technology nodes of 65 nanometers and less, the tile shapes may affect the electrical performance of the integrated circuit to an extent that can no longer be ignored. For example, placing tiles near analog devices such as transistors or resistors may affect the electrical behavior of the circuit by creating an additional coupling capacitance.

FIG. 1 schematically illustrates an example of a first method of designing an integrated circuit.

First, a schematic layout of the circuit may be generated (block 1.1). The schematic layout may be generated manually, automatically, or by a combination of manual and automatic operations, starting from, e.g., a list of functional components and connecting lines. A number of characteristics of the circuit, e.g., geometrical parameters such as dimensions and positions of the various components, or dielectrical properties, may still be undefined in the schematic layout.

A physical design may then be generated on the basis of the schematic layout (block 1.2) by determining additional characteristics of the circuit. The additional characteristics may, for example, include the dimensions and positions of the various components of the circuit. The dimensions and positions may, for example, be determined on the basis of a set of design rules and with the aim of making the circuit as small as possible.

A post-layout simulation may then be performed on the basis of the physical design, resulting in electrical simulation data (block 1.3). Depending on the electrical simulation results, the circuit designer or an automated design tool may then alter design parameters or instance parameters of the schematic layout (block 1.1). In this approach, simulating operation of the circuit (block 1.3) may enable the circuit designer to study the behavior of the circuit as defined by the physical design of block 1.2. The electrical simulation, however, usually does not take into account the possible effects of tile shapes that may be added to the circuit, as this would generally have a major impact on the simulation time. Instead, tiles shapes are usually added to the physical design (block 1.2) during a chip finishing flow. The placement of tile shapes may therefore be suboptimal in view of its electrical interaction with the rest of the circuit. Furthermore, the electrical impact of the tile shapes may be difficult to assess.

FIG. 2 schematically shows an example of a chip 10 providing an integrated circuit. The chip 10 may comprise a plurality of functional components. Two functional components 12 are shown in the Figure. Each functional component may be an elementary component such as a transistor or a capacitor or a more complex component composed of elementary components. Although only two functional components 12 are shown in the Figure, a chip may, in practice, comprises tens or thousands of functional components.

FIG. 3 shows the example of a chip 10 after an operation of adding tile shapes 14 to the chip. Each tile shape represents a physical component formed of, e.g., a layer material, e.g., an active, polysilicon or metal layer.

At least one of the functional components 12 may, for example, represent an analog block, e.g., for treating an analog signal received at circuit inputs. Depending on various design considerations, the analog blocks may or may not be tiled, i.e., they may or may not be covered by tile shapes 14.

The chip 10 may, for example, be represented numerically using a dedicated chip design tool such as the "cadence" environment. The tool may allow the program designer to enter geometrical or electrical parameters or both in a phase of generating a schematic layout similar to the schematic layout shown in block 1.1 of FIG. 1. Special code callbacks may allow to calculate suitable values of geometrical parameters if values of electrical parameters have been entered. The geometrical parameters may be used to automatically produce layouts matching these parameters. A spice model may enable simulating a behavior of the device with geometrical or electrical inputs.

As mentioned above, tile shapes are usually not taken into account in the electrical simulation of the circuit (post layout simulation), as this would significantly increase the simulation time. Furthermore, tile shapes are usually not taken into account in any pre-layout simulation.

SUMMARY OF THE INVENTION

The present invention provides a method of designing an integrated circuit and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
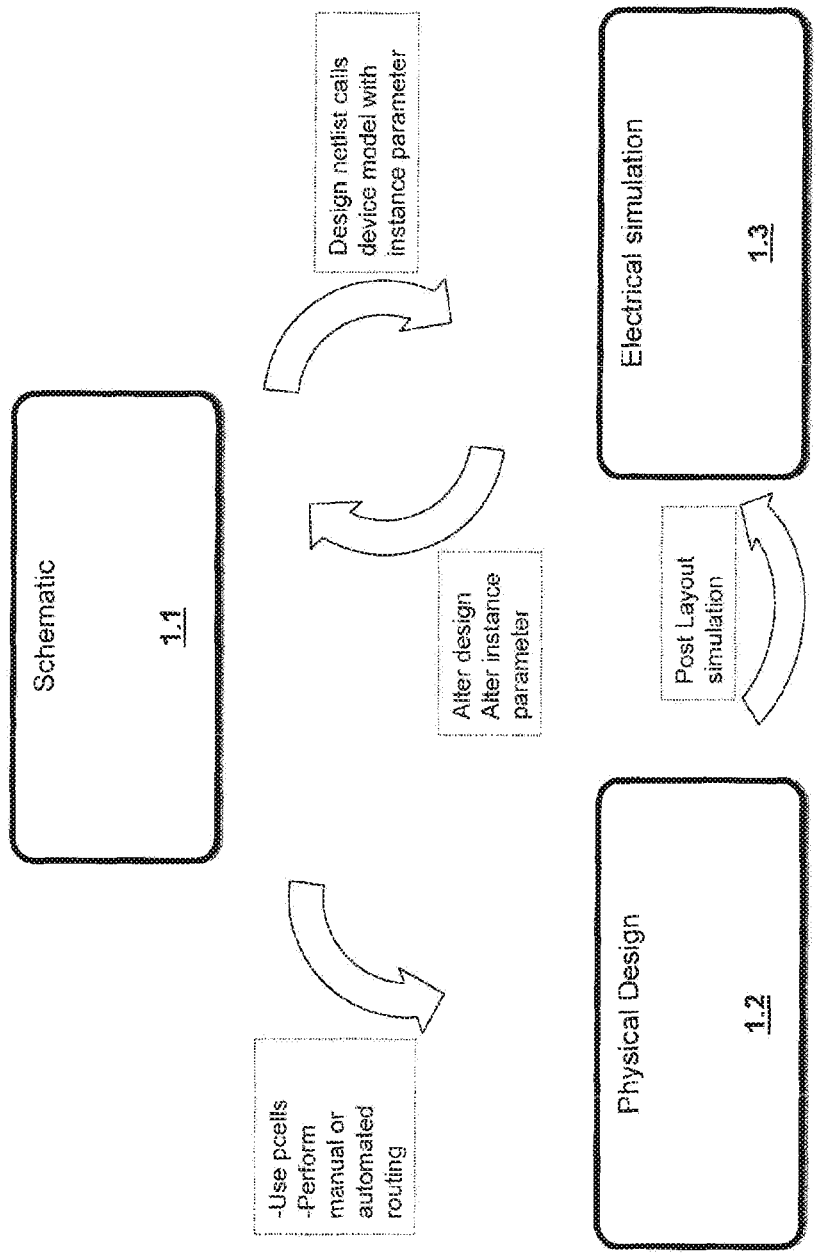
FIG. 1 shows a flow chart of an example of a method of designing an integrated circuit.
Figure 2:
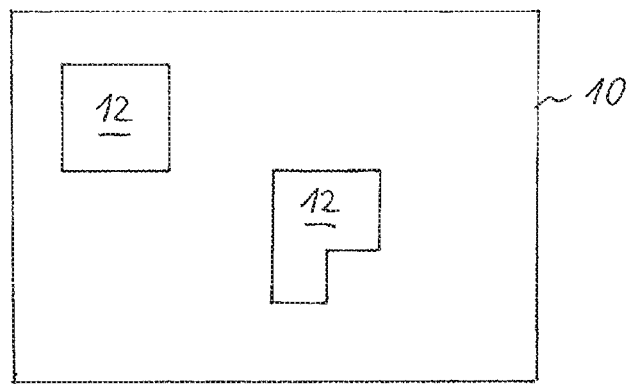
FIGS. 2 and 3 schematically illustrate an example of an operation of adding tile shapes to a chip.
Figure 3:
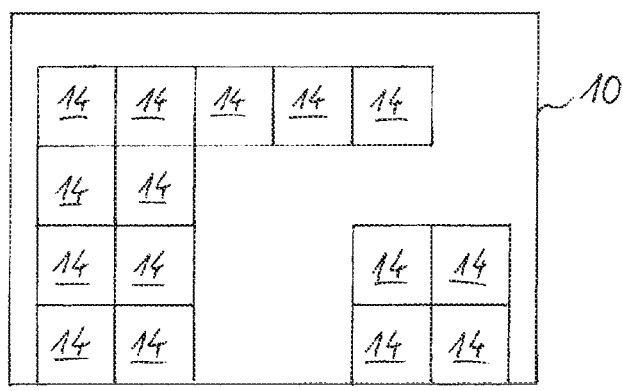

Because the illustrated embodiments of the present invention may, for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

A method of designing an integrated circuit is proposed. The integrated circuit may comprise a plurality of circuit components. The circuit components may notably include one or more functional components and one or more tile shapes. A functional component is a component that is essential for the operation of the integrated circuit, i.e., a component without which the integrated circuit would not operate correctly.

Functional components are usually interconnected in a suitable manner by dedicated connecting lines provided by conductive lines such as wires or other kinds of conductors. In this sense, a connecting line is a particular example of a functional component. Other examples of functional components may include transistors, diodes, inductors, capacitors, and transmission lines, for example.

A tile shape, in contrast, is not a functional component. Tile shapes are in general not conductively connected to any functional component of the integrated circuit. Instead, tile shapes may be provided to improve the general physical performance of the integrated circuit. Tile shapes may, for example, be arranged to improve mechanical characteristics of the integrated circuit. For instance, tile shapes may be included in the integrated circuit in order to ensure that layers of the integrated circuit remain sufficiently planar. In other words, tile shapes may be arranged to reduce a possible deformation of the integrated circuit. Such deformation may, for example, occur as a consequence of a non-uniform distribution of metal components in the integrated circuit. The use of tile shapes to improve other physical characteristics of the integrated circuit, e.g., electromagnetic or thermal characteristics, may also be envisioned. A tile shape may be defined as a piece of a suitable material that is not part of any electrical circuit implemented within the integrated circuit. An integrated circuit may be formed of a stack comprising several layers. The layers may consist of different materials. The stack may, for example, comprise one or more conductive layers and one or more isolating layers stacked atop each other in an alternating manner. A tile shape arranged within a certain layer may be formed of the material of the respective layer. For example, a tile shape formed in a metal layer may be formed of the same metal as the rest of the layer.

In accordance with the present invention, it is proposed to assign one or more tile shapes to each or at least one of the functional components of the integrated circuit that is being designed. Any functional component may be assigned one or more tile shapes. A tile shape thus associated with a certain functional unit can be described using parameters of the respective functional unit. A functional component, e.g., a transistor, resistor, or capacitor, can thus be characterized partly by its tiles shapes. Physical effects of the tile shapes can thus be taken into a account more easily at a schematic stage of analyzing or simulating the integrated circuit. For example, when a circuit designer includes a functional component in a schematic representation of the circuit, he or she may not have to specify any tile shapes manually, as the tiles shapes are already specified in terms of parameters of the functional component.

The integrated circuit may be specified in terms of one or more parameterized cells. A parameterized cell (pcell) is a generic script for defining an electronic component. An electronic component described in terms of a pcell may be referred to as an instance of the pcell.

The method may notably comprise generating a pcell instance to specify a functional component along with one or more tile shapes. A tile shape may thus be treated as a feature or parameter of the respective functional component. This allows a circuit designer to take the tile shapes into account at an early stage of the design process. For instance, it may allow to represent the tile shapes at a schematic level, that is, at a relatively rough level of detail, ignoring certain properties or parameters of the integrated circuit that is being designed. For example, the numerical values of some parameters of an instance of a pcell may be defined at the schematic level while the values of other parameters of the same instance may be defined only at a more detailed physical level. For example, some parameters, e.g., an angle on a polysilicon gate, may manifest themselves only in a physical layout, but not necessarily in a schematic layout. Other characteristics or effects that may be defined only in the physical layout may include, for example, the exact number and positions of contacts, and well proximity effects (WPE).

In other words, it is proposed to define tile shapes as parts of pcells, wherein at least some of the characteristics of the tile shapes, e.g., their lengths and widths, may be defined at the schematic level, thereby enabling a circuit designer or design tool to take physical effects of the tile shapes into account in a schematic analysis, i.e., in an analysis of the integrated circuit at the schematic level. The analysis may comprise a simulation of the behavior of the integrated circuit. The simulation may notably comprise applying a certain operating voltage at the integrated circuit. The simulation may further comprise feeding input signals to the integrated circuit.

Within the framework of the method, a netlist may be provided. A netlist is a description of connections between components of an electric circuit. The netlist may notably specify interconnections between the functional components of the integrated circuit. Furthermore, it is proposed to extend the netlist so as to include electromagnetic interactions, e.g., electrical interactions. The electrical interactions may notably include capacitive couplings. Such interactions may be unintended and may therefore considered side effects or parasitic effects between the tile shapes and functional components. Such interactions, e.g., capacitive or inductive effects, may thus be handled systematically using a formal description similar to that of conductive connections. The netlist may notably be used for simulating a behavior of the integrated circuit. For example, voltage levels or electrical current values may be simulated at various nodes of the integrated circuit. Other physical quantities, such as temperature values at selected locations within the integrated circuit, can also be simulated on the basis of the netlist, including effects of the tile shapes.

The simulation may, for example, include a first simulation and a second simulation. The first simulation may be based on a less detailed specification of the integrated circuit than the second simulation. The first simulation may be known to the person skilled in the art as a simulation at a schematic level or as a schematic simulation. The second simulation may be known as a simulation at a physical level or as a physical simulation. Both the first simulation and the second simulation may notably include electrical interactions with the one or more tile shapes.

The specification of functional components and tile shapes of the pcell instance may notably include one or more of the following: size parameters, positional parameters, dielectrical parameters, electrical conductivity parameters, thermal conductivity parameters, and heat production parameters. The value of a parameter is not necessarily defined at every stage of the method. For example, certain parameters may be disregarded in a schematic simulation of the integrated circuit and may be required only for a more detailed physical simulation of the integrated circuit. Characteristics of the tile shapes that may defined at the physical level but which may be ignored at the schematic level may include, for instance, quantities such as density, positions, and sizes. The set of parameters available at the schematic level may be sufficiently large to cover a variety of configurations of interest. In this case, the set of parameters at the schematic level and at the physical level may be identical. In another scenario, the set of parameters is insufficient to cover all configurations of interest. In this case, dedicated layout extraction may be performed. This may, however, be computationally intensive and using the parameterized cell may be inconvenient in this case.

Positions of the one or more functional components and the one or more tile shapes may be defined in accordance with one or more density rules. The density rules may, for example, be specified in a Design Rule Manual. In some scenarios, it may be convenient to define the positions of the tile shapes of a certain pcell by considering only the circuit components of the respective pcell and not considering any other circuit components. The computational effort may thus be reduced considerably. In other words, a set of tile shapes, usually a subset of all tile shapes of the integrated circuit, may be associated with a certain functional component, or with a set of functional components. Of course, in order to achieve an optimum overall density distribution, the position of a tile shape should in principle depend on the positions of all components of the integrated circuit and not only on the positions of the specific one or more functional components associated with the tile shape in question. However, in practice, the functional components are most often placed as close to each other as possible, which implies that a good overall density distribution may be obtained by the simplified approach in which the positions of tile shapes are determined in dependence on only the one or more functional components associated with it in terms of, e.g., the pcell.

A graphical representation of the integrated circuit may be displayed on a screen. A circuit designer may thus be helped in visualizing the integrated circuit and in modifying its design.

Figure 4:
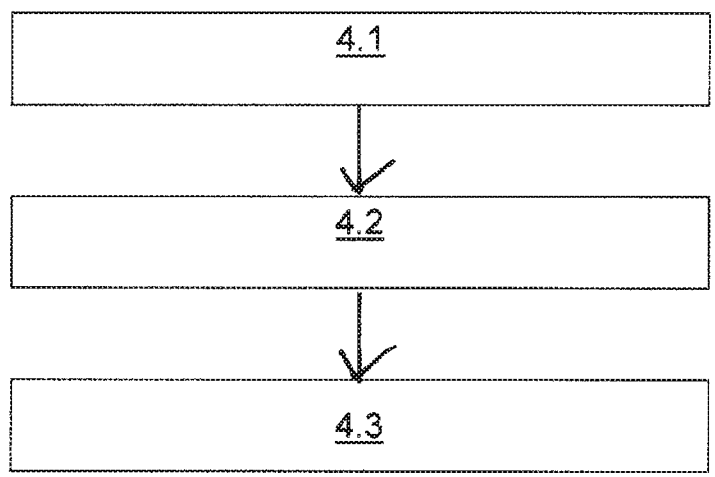
FIG. 4 shows a flow chart of another example of a method of designing an integrated circuit.

Referring now more specifically to FIG. 4, an example of a method of designing an integrated circuit is described. The method may comprise representing components of the integrated circuit on the computer and determining geometrical data of the components (4.1). The components represented on the computer may notably include one or more tile shapes. Furthermore, the operation of determining geometrical data of the components may include geometrical data of the tile shapes. The geometrical data may include dimensions and positions of the components. The operation of representing the components of the integrated circuit on a computer may include representing the tile shapes as part of the electrical circuit. More specifically, tile shapes may be treated as additional parameters of other components of the circuit, and their interactions with the other components may therefore be taken into account at an early stage of the design flow. The method may further include simulating a physical behavior of the circuit. The simulation may include a sequence of simulations. The simulations may notably differ in the number of interactions or effects that are taken into account. For instance, a first simulation may be performed at a schematic level (4.2) in which many minor effects or more subtle interactions are ignored. This so-called schematic simulation may, however, include effects of the tile shapes. Indeed, it is found that the tile shapes may exhibit interactions with the functional components of the integrated circuit that are not entirely negligible at the schematic level. A more precise simulation, referred to in the art as a physical simulation, may be performed at a later time (4.3), possibly after modifying the integrated circuit layout in view of results from the schematic simulation. It is noted that taking the tile shapes into account already at the schematic level may result in a reduction of the total simulation effort, i.e., in a reduction of the combined effort of one or more schematic simulations and one or more physical simulations.

To this end, it may be beneficial to introduce a number of parameters characterizing the tile shapes. Notably, parameters in a front end may be introduced, for example, by specifying a list of parameters producing all possible tile shapes above an instance. Furthermore, the device model may be enhanced by characterizing on silicon the device with the various tile shapes. The parameters may be netlisted, i.e., included in a netlist, so that the presence of the tile shapes and their predefined positions may be included at a schematic level. The schematic simulations may therefore reflect the impact of tiles. The parameterized cells (pcells) may be altered to draw the shapes as if they were part of the circuit.

In the proposed design method, tile shapes may be treated largely in the same manner as any functional components.

Notably, every traditional device support, such as models, netlists, and pcells, may be provided for tile shapes.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of designing an integrated circuit with a test library, the test library comprising a set of circuit components, the circuit components including one or more functional components and one or more tile shapes, wherein the method comprises, for each of said functional components:
    assigning one or more tile shapes to the respective functional component by generating a pcell instance to specify the respective functional component along with the one or more tile shapes assigned to the functional component, wherein the one or more tile shapes include corresponding geometrical data corresponding to the respective functional component;
    providing a netlist for the respective functional component, the netlist specifying interconnections between the functional components of the integrated circuit and the netlist specifying electromagnetic interactions between one or more of the tile shapes and one or more of the functional components based on the corresponding geometrical data;
    defining positions of the one or more functional components and the one or more tile shapes within the integrated circuit based on the corresponding geometrical data in accordance with one or more density rules;
    displaying a graphical representation of the integrated circuit on a screen; and
    simulating a behavior of the integrated circuit on the basis of the netlist, wherein the integrated circuit is to be fabricated.

2. The method of claim 1, wherein the netlist specifies electrical interactions between one or more of the tile shapes and one or more of the functional components.

3. The method of claim 1, wherein the simulation comprises one or more of the following:
    simulating voltage levels at one or more nodes of the integrated circuit;
    simulating electrical current values at one or more nodes of the integrated circuit; and simulating temperature values at one or more locations of the integrated circuit.

4. The method of claim 3, the simulation including a first simulation and a second simulation, wherein the second simulation is based on a more detailed specification of the integrated circuit than the first simulation and wherein both the first simulation and the second simulation include electrical or electromagnetic interactions with the one or more the shapes.

5. The method of claim 1, wherein the functional components include at least one of: a conductor, a resistor, a capacitor, an inductor, a diode, a transistor, a transmission line and an antenna.

6. The method of claim 1, wherein the specification of functional components and tile shapes of the pcell instance include one or more of the following: size data, positional data, dielectrical data, electrical conductivity data, thermal conductivity data, and heat production data.

7. The method of claim 1, comprising, for each or at least one of said functional components:
defining positions of the tile shapes assigned to the respective functional component, in accordance with one or more density rules involving this functional component these tile shapes and not involving any other functional components or tile shapes of the integrated circuit.

8. A non-transitory computer program product comprising instructions for designing an integrated circuit with a test library, the test library comprising a set of circuit components, the circuit components including one or more functional components and one or more tile shapes, wherein the instructions, when executed by a computer, cause the computer to, for each of said functional components:
assign one or more tile shapes to the respective functional component by generating a pcell instance to specify the respective functional component along with the one or more tile shapes assigned to the functional component, wherein the one or more tile shapes include corresponding geometrical data corresponding to the respective functional component;
provide a netlist for the respective functional component, the netlist specifying interconnections between the functional components of the integrated circuit and the netlist specifying electromagnetic interactions between one or more of the tile shapes and one or more of the functional components based on the corresponding geometrical data;
define positions of the one or more functional components and the one or more tile shapes within the integrated circuit based on the corresponding geometrical data in accordance with one or more density rules;
display a graphical representation of the integrated circuit on a screen; and
simulate a behavior of the integrated circuit on the basis of the netlist, wherein the integrated circuit is to be fabricated.

9. The non-transitory computer program product of claim 8, wherein the netlist specifies electrical interactions between one or more of the tile shapes and one or more of the functional components.

10. The non-transitory computer program product of claim 8, wherein the simulation comprises one or more of the following:
simulating voltage levels at one or more nodes of the integrated circuit;
simulating electrical current values at one or more nodes of the integrated circuit; and
simulating temperature values at one or more locations of the integrated circuit.

11. The non-transitory computer program product of claim 10, the simulation including a first simulation and a second simulation, wherein the second simulation is based on a more detailed specification of the integrated circuit than the first simulation and wherein both the first simulation and the second simulation include electrical or electromagnetic interactions with the one or more the shapes.

12. The non-transitory computer program product of claim 8, wherein the functional components include at least one of: a conductor, a resistor, a capacitor, an inductor, a diode, a transistor, a transmission line and an antenna.

13. The non-transitory computer program product of claim 8, wherein the specification of functional components and tile shapes of the pcell instance include one or more of the following: size data, positional data, dielectrical data, electrical conductivity data, thermal conductivity data, and heat production data.

* * * * *